United States Patent [19]

Ralvert

[11] Patent Number: 4,867,998
[45] Date of Patent: Sep. 19, 1989

[54] PROCESS FOR MANUFACTURING POTATO FIBERS

[75] Inventor: Klas Ralvert, Karlshamn, Sweden

[73] Assignee: Sveriges Stärkelseproducenter, Karlshamn, Sweden

[21] Appl. No.: 187,524

[22] PCT Filed: Aug. 24, 1987

[86] PCT No.: PCT/SE87/00369

§ 371 Date: Jun. 16, 1988

§ 102(e) Date: Jun. 16, 1988

[87] PCT Pub. No.: WO88/01138

PCT Pub. Date: Feb. 25, 1988

[30] Foreign Application Priority Data

Aug. 22, 1986 [SE] Sweden .................................. 8603545

[51] Int. Cl.$^4$ ............................................. A23L 1/216
[52] U.S. Cl. ...................................... 426/464; 127/66; 426/481; 426/489; 426/637
[58] Field of Search ............... 426/637, 455, 456, 464, 426/478, 481, 489, 518, 457; 127/66, 67

[56] References Cited

U.S. PATENT DOCUMENTS

| | | | |
|---|---|---|---|
| 3,079,283 | 2/1963 | Dreissen | 127/67 |
| 3,890,888 | 6/1975 | Verberne | 426/489 X |
| 3,948,677 | 4/1976 | Huster et al. | 127/67 X |

FOREIGN PATENT DOCUMENTS

| | | | |
|---|---|---|---|
| 2323248 | 11/1974 | Fed. Rep. of Germany | 127/66 |
| 465426 | 6/1975 | U.S.S.R. | 127/66 |
| 649399 | 2/1979 | U.S.S.R. | 426/637 |
| 497678 | 12/1938 | United Kingdom | 127/66 |

*Primary Examiner*—Arthur L. Corbin
*Attorney, Agent, or Firm*—Brooks & Kushman

[57] ABSTRACT

A process for manufacturing potato fibers and potato fibers manufactured in the process. According to the process, potatoes are subjected to washing, dividing into potato juice, starch and pulp, and subsequently separating of starch from potato juice and pulp. The process is distinguished in that solid impurities are removed from the pulp, potato juice being defoamed and added to the pulp to form a pulp/potato juice mixture which is relieved of solid impurities by density separation. Subsequently, the pulp is dewatered to remove part of the potato juice, and the dewatered pulp is refined such that the content of potato juice and dissolved salts in the pulp is reduced in that the pulp is prepressed to a dry solids content of 20-30% and thereupon washed by adding water to obtain a dry solids content of 11-16%, whereupon the pulp is finally pressed to a dry solids content of 20-30%. Finally, the refined pulp is subjected to drying and grinding to the final potato fiber product.

9 Claims, 1 Drawing Sheet

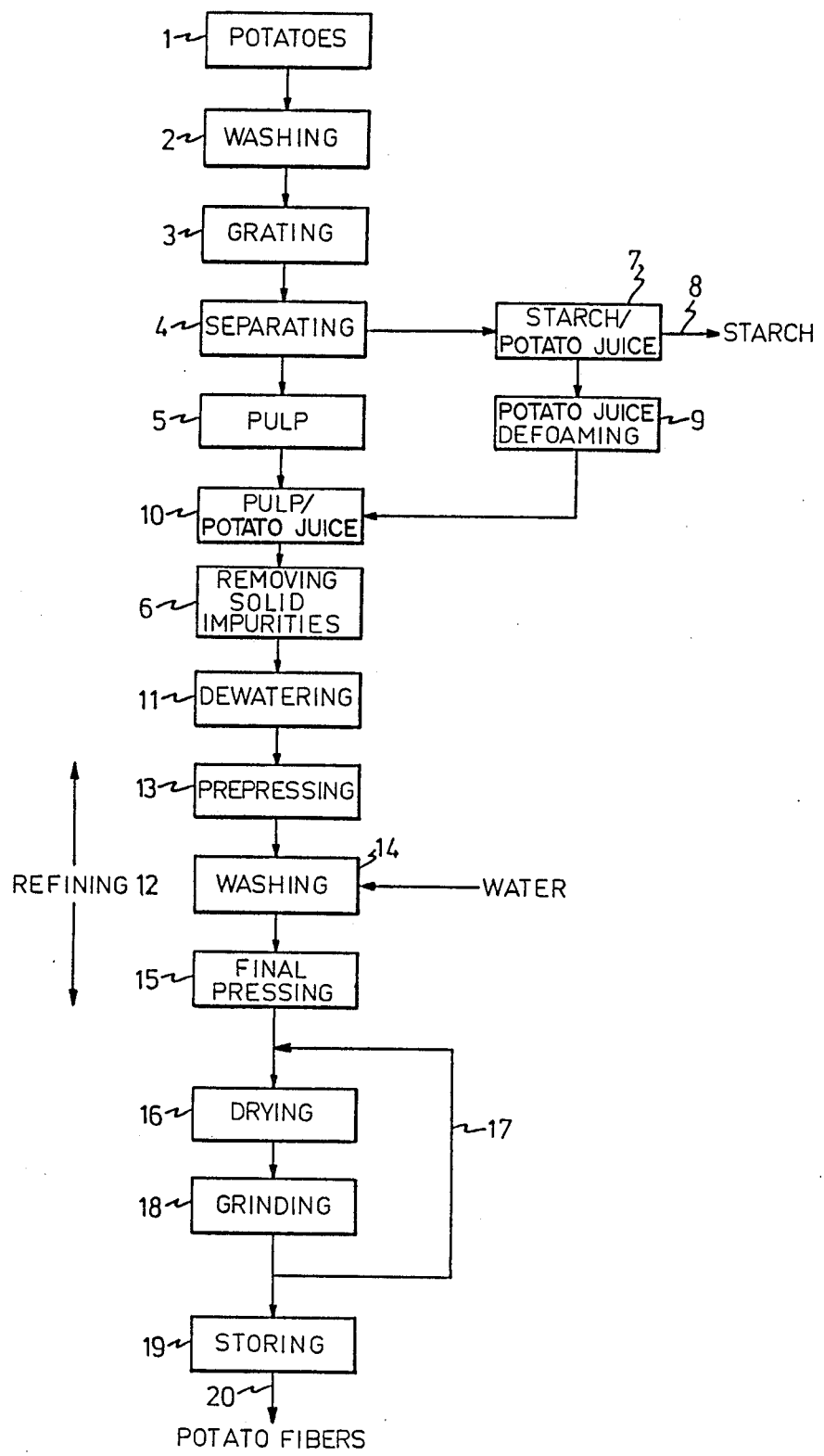

PROCESS FOR MANUFACTURING POTATO FIBERS

BACKGROUND OF THE INVENTION

The present invention relates to a process for manufacturing potato fibers and to potato fibers manufactured in the process.

Potatoes are a natural product which, in addition to being an important staple food, also are the raw material for manufacturing starch and alcohol. In conventional manufacture of starch from potatoes, the by-products potato pulp, potato juice and potato water are obtained besides starch. The potato juice is the liquid content of the potatoes, and the potato water is diluted potato juice obtained in the starch manufacturing process. The potato pulp is the fiber mass and part of the potato juice, usually about 20%, and normally has a total solids content (TS) of about 13–15%.

In starch manufacture, starch is the desired main product, and potato juice and potato pump are by-products which cannot simply be passed to waste since they can cause waste disposal and environmental problems. A further problem are the large amounts of potato juice and potato pulp. Up to now, the by-products have been taken care of in that potato juice is used as fertiliser and potato pulp as cattle wet fodder. However, this solution cannot be considered optimal since the starch manufacturer's costs for getting rid of the potato pulp are unfavourably related to the profit obtainable. Moreover, potato pulp is rather difficult to handle because of its highly viscous and sticky nature.

As will be appreciated, it would be a great step forward if one could provide a process for refining potato pulp to a product which is more readily handled and does not cause waste disposal or environmental problems and also has a higher economic value.

A quite different problem is that, in recent years, it has been found that people in general are eating improper food in the sense that the content of food fibers is too low. Nutrionists and hygienists therefore recommend a substantially increased intake of fibers. Such increased intake can be achieved either by choosing particularly fiber-rich foodstuffs or by adding food fibers to ordinary foodstuffs so as to increase their content of food fibers. To the last-mentioned purpose, attempts have been made with varying success at manufacturing different kinds of food fibers based on plants, for use in foodstuffs. In this context, it has been difficult to manufacture food fibers which are neutral in taste, i.e. which have no undesired taste of the plant from which they originate, or because of the manufacturing process. Consequently, the food industry is in need of food fibers which are neutral in taste and which can be used as a fiber addition in foodstuffs.

SUMMARY OF THE INVENTION

The object of the present invention is to try and solve or reduce the above-mentioned problems and thus eliminate the waste disposal and environmental problems connected with potato pulp, and to provide a refined, economically valuable product which can be readily handled and used as a food fiber addition in foodstuffs, neutral in taste.

This object is achieved according to the invention in that dried potato fibers are manufactured from potato pulp in the manner defined in the appended claims and the description below.

The process according to the invention comprises the following steps:
(a) washing potatoes,
(b) dividing the potatoes into potato juice, starch and pulp,
(c) separating the starch from the potato juice and the pulp, characterised in that
(d) solid impurities are removed from the pulp, the potato juice being defoamed and added to the pulp to form a pulp/potato juice mixture which is relieved of solid impurities by density separation, whereupon
(e) the pulp is dewatered to remove part of the potato juice, and
(f) the dewatered pulp is refined such that the content of potato juice and dissolved salts in the pulp is reduced in that the pulp is prepressed to a dry solids content of 20–30% and then washed by adding water to obtain a dry solids content of 11–16%, whereupon the pulp is finally pressed to a dry solids content of 20–30%, after which the refined pulp is subjected to
(g) drying and
(h) grinding to the final potato fiber product.

The potato fibers manufactured in the process according to the invention are characterised in that they have a particle size of not more than 1 mm, contain not more than about 15% by weight of protein, not more than about 15% by weight of starch, and that the remainder consists of lignin and polysaccharides other than starch.

It has been found that the potato fibers manufactured according to the invention seem to bring further unexpected and favourable effects besides the advantages as a fiber addition in foodstuffs, which is neutral in taste. The isolation of the potato cell wall substance according to the present invention renders it possible to utilise the substances (cellulose, hemicelluloses, lignin and pectin substances) which occur naturally in potatoes. These substances can have positive effects on diseases such as piglet diarrhoea which is a very serious and frequently fatal disease. It has also been convincingly shown that, in diabetics, pectin substances and hemicelluloses give a flattened blood sugar curve and result in a reduced need for insulin.

The potato fiber product obtained according to the present invention consists of particles comprising cell fragments of the walls of the potato tissue. The particles contain not more than about 15% by weight, preferably not more than about 10% by weight of starch, and not more than about 15% by weight, preferably not more than about 10% by weight of protein, the balance being cellulose-containing cell residues. These fragments represent a porous network with a plurality of cavities and pores. Some fragments contain residual starch grains around which proteins are enriched. The cavities and pores each take up and bind water, and thee properties are highly developed in potato fibers. The total fiber volume determines first of all the water absorbing capacity. In their dry state, the particles are very compact, but when water is added, the particles swell rapidly and are separated into a number of smaller and highly swollen particles. The potato fibers can be admixed as a binder and stabiliser to food products to increase the fiber content, which is advantageous from the viewpoint of nutrition. The fiber swelling degree and the particle size influence the water-retaining capacity and the consistency of the final product. The average particle size of the potato fibers according to the invention is not more than about 1 mm, preferably about 0.5 mm. By average particle size is meant the diameter of a circle, the surface of which is as large as the average projected surface of the potato fiber.

BRIEF DESCRIPTION OF THE DRAWING

The invention will not be described in detail below, reference being had to the accompanying drawing which shows a schematic flow chart of the steps in the process according to the invention for manufacturing potato fibers.

DESCRIPTION OF THE PREFERRED EMBODIMENT

In the process according to the invention, potatoes 1 are supplied to the factory by the grower. After stones and loose earth have been removed, the potatoes are cleaned by washing 2 in plenty of water. Subsequently and optionally after intermediary storing, the washed potatoes are subjected to grating 3 in order to divide them into potato juice, starch and pulp. Grating is carried out in rotating drums (not shown) provided with sawblade-shaped cutting means which cut or grate the potatoes and release the starch from the cell walls.

Of the components obtained by grating, the pulp is of interest in the process according to the present invention and therefore must be separated. This is done in a separating step 4, preferably by means of rotating screens, so-called centrifugal screens, in which the fiber mass forming the pulp is separated from the starch and the main part of the potato juice. The pulp is washed out by means of potato juice, and therefore no water need be supplied from outside. On the whole, the basic principle of the process according to the present invention is to try and avoid any unnecessary supply of water or other liquid. In fact, any additional liquid increases the volume of material to be treated and taken care of for subsequent storage or transportation and thus increases also the process costs. Moreover, environmental consideration requires that the process be kept as closed as possible.

The pulp 5 obtained from the separation 4 normally has a dry solids content of about 12–17%, preferably about 13–15%, and contains about 20% of the original potato juice from the potatoes.

Although the potatoes have first been treated for removal of adhering loose earth and washed in a separate washing step 2, the pulp may still contain a certain amount of solid impurities, such as sand, gravel and the like. Since the potato fibers according to the invention as finally manufactured from the pulp are to be used as foodstuffs, it is a requirement that all impurities be removed as completely as possible. For this reason, the pulp is subjected to a separate treatment 6 for the removal of any residual solid impurities. This treatment is based on the principle that solid impurities are heavier than pulp, and uses gravity-increasing equipment, preferably cyclones. However, the pulp 5 has a far too viscous consistency to allow direct exposure to the removal treatment and must first be diluted to a state of lower viscosity. For this dilution, potato juice is used, but the fruit juice earlier obtained together with starch in the grating step 3 and the separating step 4 is too viscous because of its high foam content and cannot be used directly for the purpose. To make the potato juice fit for use as a pulp diluent, the foam must be removed, and to this end the mixture of starch and potato juice 7 obtained from the separation 4 is separated, the starch 8 proceeding to e.g. starch manufacture, and the separated potato juice being relieved of foam in a foam removing step 9. It has now been found that a particularly efficient and advantageous expedient to remove the foam is to supply the foaming potato juice to a hydrocyclone plant from which defoamed potato juice is obtained as a reject and the foam phase as an accept. The hydrocyclone treatment can be performed in batteries of hydrocyclones coupled in parallel or in series.

By the foam removal treatment described above, the unmanageable, foaming potato juice is, according to the invention, readily transformed into a low-viscosity liquid which contains no foam and is easy to handle and well suited for its purpose as a diluent for the pulp 5, prior to the subsequent removal 6 of residual solid impurities.

The defoamed low-viscosity potato juice is mixed with pulp to form a pulp/potato juice mixture 10 having a dry solids content of about 4–7%, preferably about 5–6%. From the pulp/potato juice mixture 10, solid impurities are then removed in an impurity removal step 6 in the manner indicated above by means of, for example, a cyclone or decanting centrifuge. By such density separation, the pulp is efficiently relieved of heavy solid impurities, such as sand, gravel etc., which is a requirement in the manufacture of food products.

After the impurity removal 6, part of the potato juice is removed from the pulp by dewatering 11, such that the dry solids content of the pulp increases to about 12–17%, preferably about 14–16%. Dewatering can be carried out by means of rotating screens, so-called centrifugal screens, like in the separating step 4 as described above.

Although the pulp obtained after dewatering 11 is relieved of solid impurities, it cannot as yet be used, after drying, as a fiber product in foodstuffs, since the fibers manufactured are not neutral in taste but have a flavour of potatoes. The reason probably is that the pulp contains potato juice and, above all, the dissolved salts included in the potato juice. To provide a satisfactory potato fiber product which is neutral in taste, the pulp must therefore be refined, which is effected in a refining step 12 comprising three partial steps, viz. prepressing 13, washing 14 and final pressing 15. The main purpose of the refining 12 is to replace part of the pulp potato juice contents by water, and more particularly, about 30–50%, preferably about 35–45% and most advantageously about 40% of the pulp potato juice contents are replaced by water. To accomplish this, part of the pulp potato juice is removed in a prepressing step 13, whereby the dry solids content of the pulp increases from about 12–17% as stated above, preferably about 14–16% to about 20–30%, preferably about 22–27%. Prepressing 13 is suitably carried out by means of a screw-type press (not shown).

Then water is added to the prepressed pulp by washing 14. In a strict sense, the washing 14 is no real washing, but rather a water addition or a replacement of the pressed-off potato juice by water, but the total result is that the pulp is washed so that the potato juice and its salts are removed from the pulp. In order to distribute the added water as uniformly as possible, it is preferably added while the prepressed pulp is being mixed. Conveniently, such mixing is carried out in a so-called pulper. The amount of water added to the pulp in connection with washing 14 corresponds approximately to the amount of potato juice pressed out during the prepressing 13 such that after the washing 14, the dry solids content of the pulp is about 11–16%, preferably about 13-14%. It should be pointed out that the washing step 14 is principally the only process step in which extra liquid is added. Otherwise, the process uses only the own potato juice of potatoes, which makes for a substantially closed process. As emphasised above, this is of advantage both to the process and to the environment.

After washing 14, the pulp is finally pressed in a final pressing step 15 in order to reduce the liquid content of the pulp prior to the subsequent drying. In the final pressing, the dry solids content is increased to about 20-30%, preferably to about 22-27%. A suitable dry solids value, both in the prepressing step 13 and in the final pressing step 15, has been found to be about 23-25%. Like the prepressing 13, also the final pressing is suitably carried out in a screw-type press (not shown).

The pulp thus refined is then ready for drying and is, if required, ground to the final potato fiber product. In and per se, the refined pulp alone can be dried in the drying step 16 and preferably is mixed with previously dried and ground potato fibers 17 such that a mixture having an average dry solids content of about 40-60%, preferably about 50%, is obtained which subsequently is dried. The dried fiber product which is mixed in the refined pulp has a dry solids content of 85-95%, usually about 90%. The actual drying of the refined pulp is effected in conventional manner by means of hot air in drying cyclones (not shown) from which the dried pulp is extracted as a reject.

After drying 16, screening and, optionally, grinding 18 to the final potato fiber product take place. Screening and grinding are also carried out in conventional manner, an average particle size of not more than about 1 mm, preferably not more than about 0.5 mm, being desired.

While, as mentioned above, part of the dried and ground potato fibers 17 are recycled for admixture to the pulp obtained in the refining step, the remainder is passed on to storage 19 before it is sold and distributed as potato fibers 20 ready for consumption.

I claim:

1. A process for manufacturing potato fibers comprising the steps of:
   (a) washing potatoes;
   (b) dividing the potatoes into potato juice, starch and pulp;
   (c) separating the starch from the potato juice and the pulp;
   (d) removing solid impurities from the pulp;
   (e) dewatering the pulp to remove part of the potato juice;
   (f) refining the dewatered pulp;
   (g) drying; and then
   (h) grinding to a final potato fiber product; wherein in step (d) the potato juice is defoamed and added to the pulp to form a pulp/potato juice mixture which has a dry solids content of about 4-7% and relieving the pulp/potato juice mixture of solid impurities by density separation;
   in step (f) the pulp, which has a dry solids content of 12-17%, is refined such that the content of potato juice and dissolved salts in the pulp is reduced by pressing the pulp to a dry solids content of 20-30% and then washing the pulp by adding water to obtain an dry solids content of 11-15%, whereupon the pulp is finally pressed to a dry solids content of 20-30%; and in step (h) the refined and dried pulp is ground to a final potato fiber product having an average particle size of not more than about 1 mm.

2. A process as claimed in claim 1 wherein the potato juice added in step (d) is defoamed in a hydrocyclone.

3. A process as claimed in claim 2 wherein the mixture of defoamed potato juice and pulp in step (d) is relieved of solid impurities in a cyclone.

4. A process as claimed in claim 1 wherein the mixture of defoamed potato juice and pulp in step (d) is relieved of solid impurities in a cyclone.

5. A process as claimed in claim 1 wherein the pressing in the refining step (f) is carried out in screw presses.

6. A process as claimed in claim 1 wherein the water is added to the pressed pulp in the refining step (f) while mixing the pulp.

7. A process as claimed in claim 1 wherein the dried pulp is ground in step (h) to an average particle size of not more than about 0.5 mm.

8. A process as claimed in claim 1 wherein in step (d) the pulp/potato juice mixture has a dry solids content of about 5-6%.

9. A process as claimed in claim 1 wherein in step (f) dried pulp is added to the refined pulp before drying in step (g) such that the pulp supplied to drying step (g) has a total dry solid content of 40-60%.

* * * * *